United States Patent
Thompson

(10) Patent No.: US 11,293,502 B1
(45) Date of Patent: Apr. 5, 2022

(54) LEVER ACTUATED DISK PARKING BRAKE FOR A VEHICLE

(71) Applicant: Parker-Hannifin Corporation, Cleveland, OH (US)

(72) Inventor: Randall D. Thompson, Lancaster, SC (US)

(73) Assignee: Parker-Hannifin Corporation, Cleveland, OH (US)

( * ) Notice: Subject to any disclaimer, the term of this patent is extended or adjusted under 35 U.S.C. 154(b) by 108 days.

(21) Appl. No.: 16/846,889

(22) Filed: Apr. 13, 2020

Related U.S. Application Data

(60) Provisional application No. 62/863,334, filed on Jun. 19, 2019.

(51) Int. Cl.
| | |
|---|---|
| *F16D 55/16* | (2006.01) |
| *B60T 7/10* | (2006.01) |
| *F16D 125/68* | (2012.01) |
| *F16D 55/00* | (2006.01) |
| *B60T 1/06* | (2006.01) |

(52) U.S. Cl.
CPC .............. *F16D 55/16* (2013.01); *B60T 7/102* (2013.01); *B60T 1/065* (2013.01); *F16D 2055/002* (2013.01); *F16D 2125/68* (2013.01)

(58) Field of Classification Search
CPC .......... B60T 7/102; B60T 1/065; F16D 55/16; F16D 2055/002; F16D 2125/68
USPC .............................................. 188/72.9, 73.34
See application file for complete search history.

(56) References Cited

U.S. PATENT DOCUMENTS

| 3,809,190 A | * | 5/1974 | Evans | ..................... F16D 65/18 |
| | | | | 188/72.2 |
| 3,848,704 A | * | 11/1974 | Falk | ........................ F16D 65/18 |
| | | | | 188/71.8 |

(Continued)

FOREIGN PATENT DOCUMENTS

| CN | 2647688 Y | 10/2004 |
| CN | 204978097 U | 1/2016 |

(Continued)

OTHER PUBLICATIONS

AS Motor—AS 531 2T ES MK B, https://www.as-motor.com/product/as-531-2t-es-mk-b/, retrieved from the internet Jun. 28, 2019.

*Primary Examiner* — Nishal R Sahni
(74) *Attorney, Agent, or Firm* — McDonnell Boehnen Hulbert & Berghoff LLP

(57) ABSTRACT

An example brake assembly comprises: a brake disk; an outer brake caliper disposed on a first side of the brake disk; an inner brake caliper disposed on a second side of the brake disk such that the brake disk is interposed between the outer brake caliper and the inner brake caliper; a mounting plate disposed adjacent to the inner brake caliper, wherein the mounting plate is coupled to the inner brake caliper and the outer brake caliper, and wherein the mounting plate comprises a slot; and a brake actuation lever pivotably coupled to the mounting plate and disposed through the slot of the mounting plate to interface with the inner brake caliper, wherein rotation of the brake actuation lever causes the inner brake caliper to move toward the outer brake caliper, thereby squeezing the brake disk between the inner brake caliper and the outer brake caliper.

20 Claims, 10 Drawing Sheets

(56) References Cited

U.S. PATENT DOCUMENTS

| | | | | |
|---|---|---|---|---|
| 4,173,269 A | * | 11/1979 | Craig | B60T 1/065 188/218 XL |
| 4,544,045 A | * | 10/1985 | Runkle | F16D 65/18 188/106 F |
| 5,433,298 A | * | 7/1995 | Antony | F16D 65/183 188/72.7 |
| 5,547,048 A | * | 8/1996 | Anthony | F16D 65/18 188/72.7 |
| 5,921,354 A | * | 7/1999 | Evans | F16D 65/18 188/73.2 |
| 6,305,510 B1 | * | 10/2001 | Bunker | F16D 65/0977 188/218 XL |
| 7,143,873 B2 | | 12/2006 | Pascucci et al. | |
| 2009/0266654 A1 | * | 10/2009 | Holland | F16D 55/227 188/73.31 |
| 2010/0307875 A1 | * | 12/2010 | Ilg | F16D 65/123 188/218 XL |
| 2012/0312644 A1 | * | 12/2012 | Baldeosingh | F16D 65/12 188/72.9 |
| 2013/0112515 A1 | * | 5/2013 | Shinagawa | F16D 65/12 188/218 XL |
| 2016/0025166 A1 | * | 1/2016 | Plantan | F16D 65/123 188/218 XL |

FOREIGN PATENT DOCUMENTS

| | | |
|---|---|---|
| CN | 207269396 U | 4/2018 |
| JP | 2000 291699 | 10/2000 |
| KR | 20170070513 A * | 6/2017 |

* cited by examiner

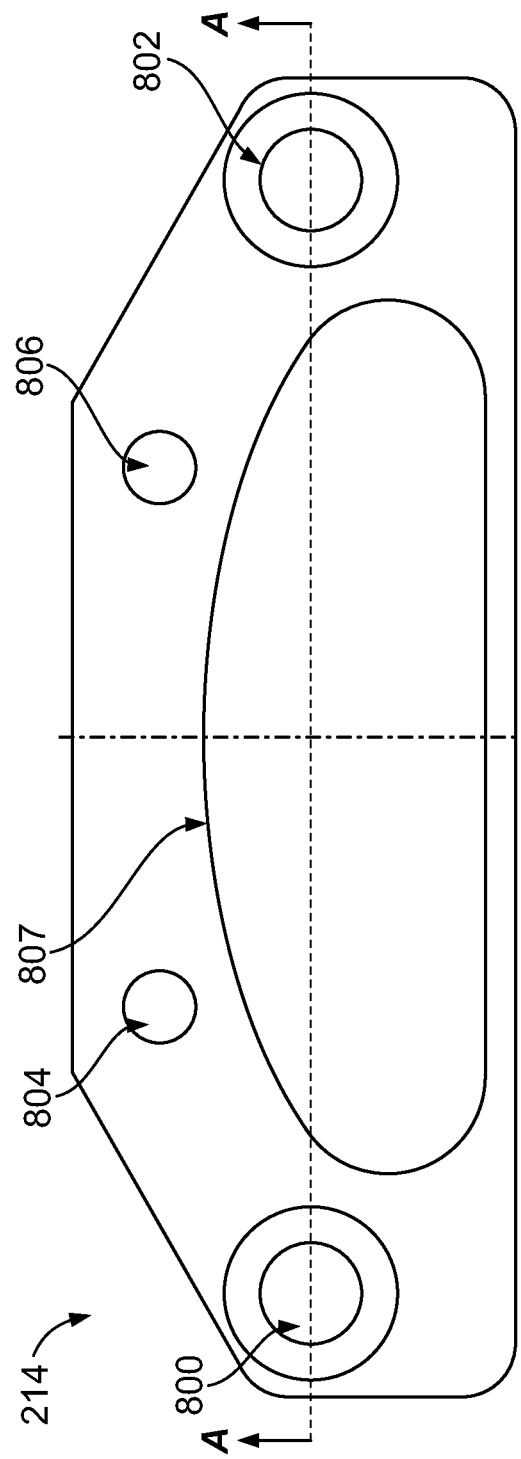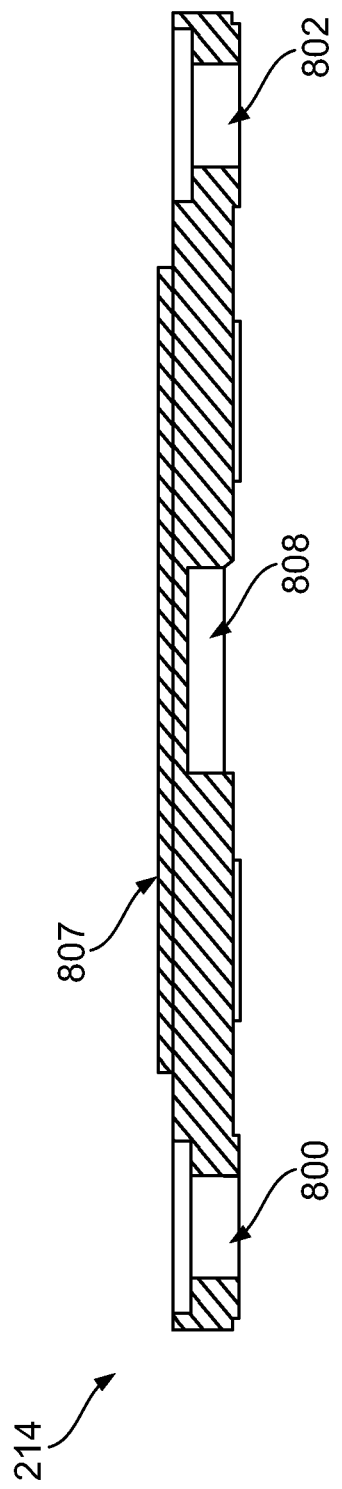

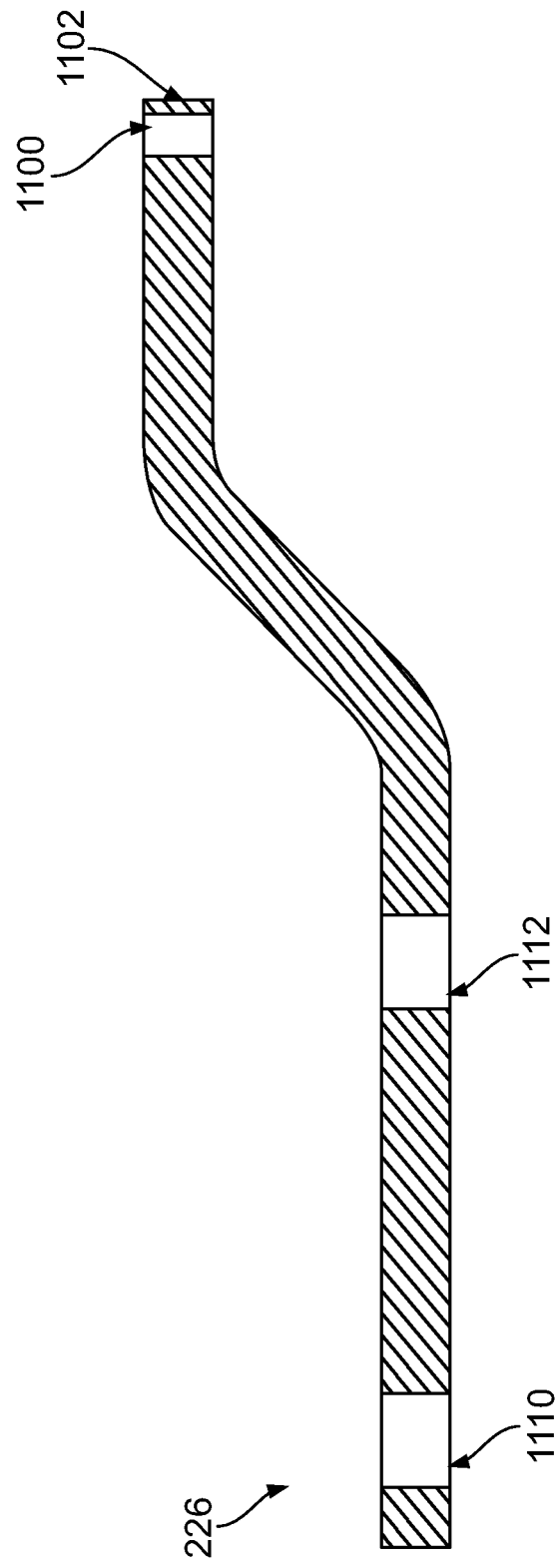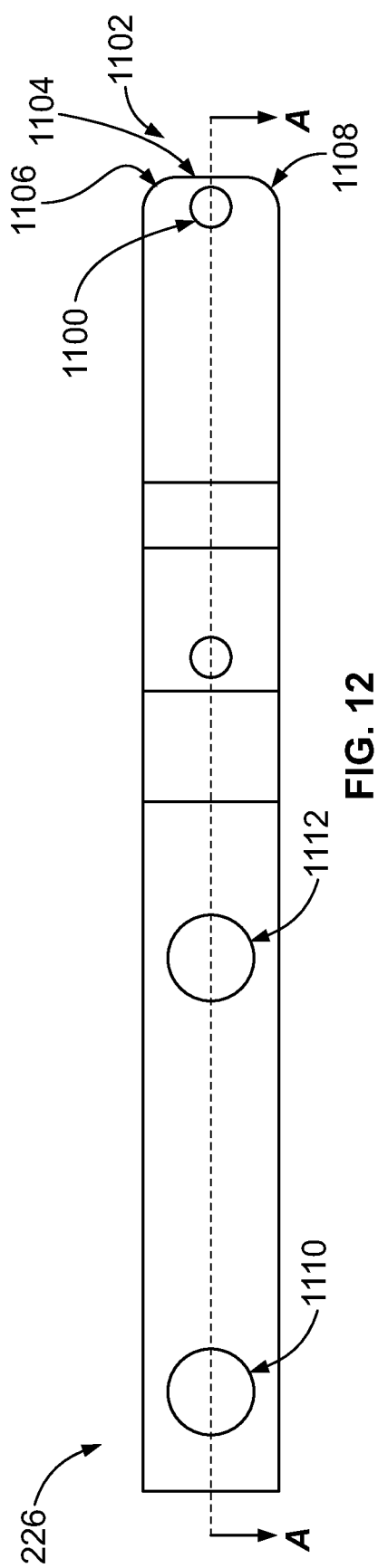
FIG. 11
FIG. 12

LEVER ACTUATED DISK PARKING BRAKE FOR A VEHICLE

CROSS REFERENCE TO RELATED APPLICATION

The present application claims priority to U.S. Provisional patent application No. 62/863,334, filed on Jun. 19, 2019, and entitled "Lever Actuated Disk Parking Brake for a Vehicle," the entire contents of which are herein incorporated by reference as if fully set forth in this description.

TECHNICAL FIELD

This invention relates to a parking brake for use in vehicles such as lawn and garden tractors, stand-on mowers, walk-behind snow throwers and mowers, and the like.

BACKGROUND

Conventional mowers are typically driven by dual hydrostatic transmissions, one hydrostatic transmission for each wheel, powered by belts and pulleys from an internal combustion engine. The hydrostatic transmissions can be used to brake or slow down the mower during its operation, e.g., when the engine is turned on. However, when the engine is turned off, the hydrostatic transmission might be not be operational and might not be used to keep the mower parked and secure it in-place.

Some conventional mowers have drum-type brakes. In such type of brakes, an operator can actuate a parking brake, thereby causing brake shoes to be pushed outward to engage a drum coupled to a hub of the wheel of the mower. Engagement or friction between the shoes and the drum, prevent the drum and the wheel from rotating. In other conventional systems, a gearbox couples a drive system to the wheel, and parking brakes are engaged by preventing a gear within the gearbox from rotating when the mower is parked. These conventional systems involving drum-type brakes or having driving system with gearboxes can be costly.

It may thus be desirable to have a parking brake for use with a vehicle (e.g., a mower) driven with a hydrostatic transmission, and it may also be desirable to have a parking brake configuration that is less costly than drum-type brakes. It is with respect to these and other considerations that the disclosure made herein is presented.

SUMMARY

The present disclosure describes implementations that relate to lever actuated disk parking brake for a vehicle.

In a first example implementation, the present disclosure describes a brake assembly. The brake assembly comprises: (i) a brake disk; (ii) an outer brake caliper disposed on a first side of the brake disk; (iii) an inner brake caliper disposed on a second side of the brake disk such that the brake disk is interposed between the outer brake caliper and the inner brake caliper, wherein the inner brake caliper comprises a key slot facing away from the brake disk; (iv) a key disposed in the key slot; (v) a mounting plate disposed adjacent to the inner brake caliper, wherein the mounting plate is coupled to the inner brake caliper and the outer brake caliper, and wherein the mounting plate comprises a slot; and (vi) a brake actuation lever pivotably coupled to the mounting plate and disposed through the slot of the mounting plate to interface with the key, wherein rotation of the brake actuation lever causes the key and the inner brake caliper to move toward the outer brake caliper, thereby squeezing the brake disk between the inner brake caliper and the outer brake caliper.

In a second example implementation, the present disclosure describes a vehicle comprising a wheel; a hub mounted to the wheel; and a brake assembly. The brake assembly comprises: (i) a brake disk mounted to the hub; (ii) an outer brake caliper disposed on a first side of the brake disk; (iii) an inner brake caliper disposed on a second side of the brake disk such that the brake disk is interposed between the outer brake caliper and the inner brake caliper; (iv) a mounting plate disposed adjacent to the inner brake caliper, wherein the mounting plate is coupled to the inner brake caliper and the outer brake caliper, and wherein the mounting plate comprises a slot; and (v) a brake actuation lever pivotably coupled to the mounting plate and disposed through the slot of the mounting plate to interface with the inner brake caliper, wherein rotation of the brake actuation lever causes the inner brake caliper to move toward the outer brake caliper, thereby squeezing the brake disk between the inner brake caliper and the outer brake caliper and precluding the hub and the wheel from rotating.

In a second example implementation, the present disclosure describes a method of assembling a brake assembly. The method comprises: (i) positioning an outer brake caliper on a first side of a brake disk, wherein the outer brake caliper comprises a plurality of through-holes; (ii) inserting respective fasteners through the plurality of through-holes of the outer brake caliper; (iii) positioning one or more springs about at least a subset of the respective fasteners; (iv) placing a shim on a second side of the brake disk; (v) positioning an inner brake caliper on the second side of the brake disk, wherein the inner brake caliper comprises a respective plurality of through-holes corresponding to the plurality of through-holes of the outer brake caliper, and wherein the respective fasteners are inserted through the respective plurality of through-holes to couple the inner brake caliper to the outer brake caliper, such that the brake disk is interposed between the outer brake caliper and the inner brake caliper with the shim separating the inner brake caliper from the brake disk, and the one or more springs are interposed between the outer brake caliper and the inner brake caliper, and wherein the inner brake caliper includes a key hole facing away from the brake disk; (vi) placing a key in the key hole of the inner brake caliper such that the key is disposed partially in the key hole and partially protruding from the inner brake caliper; (vii) coupling a mounting plate to the inner brake caliper and the outer brake caliper via the respective fasteners inserted through the plurality of through-holes of the outer brake caliper, the respective plurality of through-holes of the inner brake caliper, and corresponding through-holes in the mounting plate, wherein the mounting plate comprises a slot; (viii) removing the shim interposed between the brake disk and the inner brake caliper; (ix) tightening the respective fasteners to a particular torque; and (x) pivotably mounting a brake actuation lever through the slot of the mounting plate, such that the brake actuation lever interfaces with the key disposed in the key hole of the inner brake caliper.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

FIG. 8 illustrates a front view of an inner brake caliper, in accordance with an example implementation.

FIG. 9 illustrates a bottom cross-sectional view of the inner brake caliper of FIG. 8, in accordance with an example implementation.

FIG. 11 illustrates a cross-sectional side view of a brake actuation lever, in accordance with an example implementation.

FIG. 12 illustrates a top view of the brake actuation lever of FIG. 11, in accordance with an example implementation.

DETAILED DESCRIPTION

In examples, a mower can be slowed down or braked during operation using hydrostatic transmissions that transmit power from an engine to the wheels of the lawn mower. It may be desirable to have a parking brake that can preclude the mower from moving when the mower is parked and the engine is turned off. Disclosed herein are systems and methods for a lever actuated disk-type parking brake for a mower.

Figure 1:
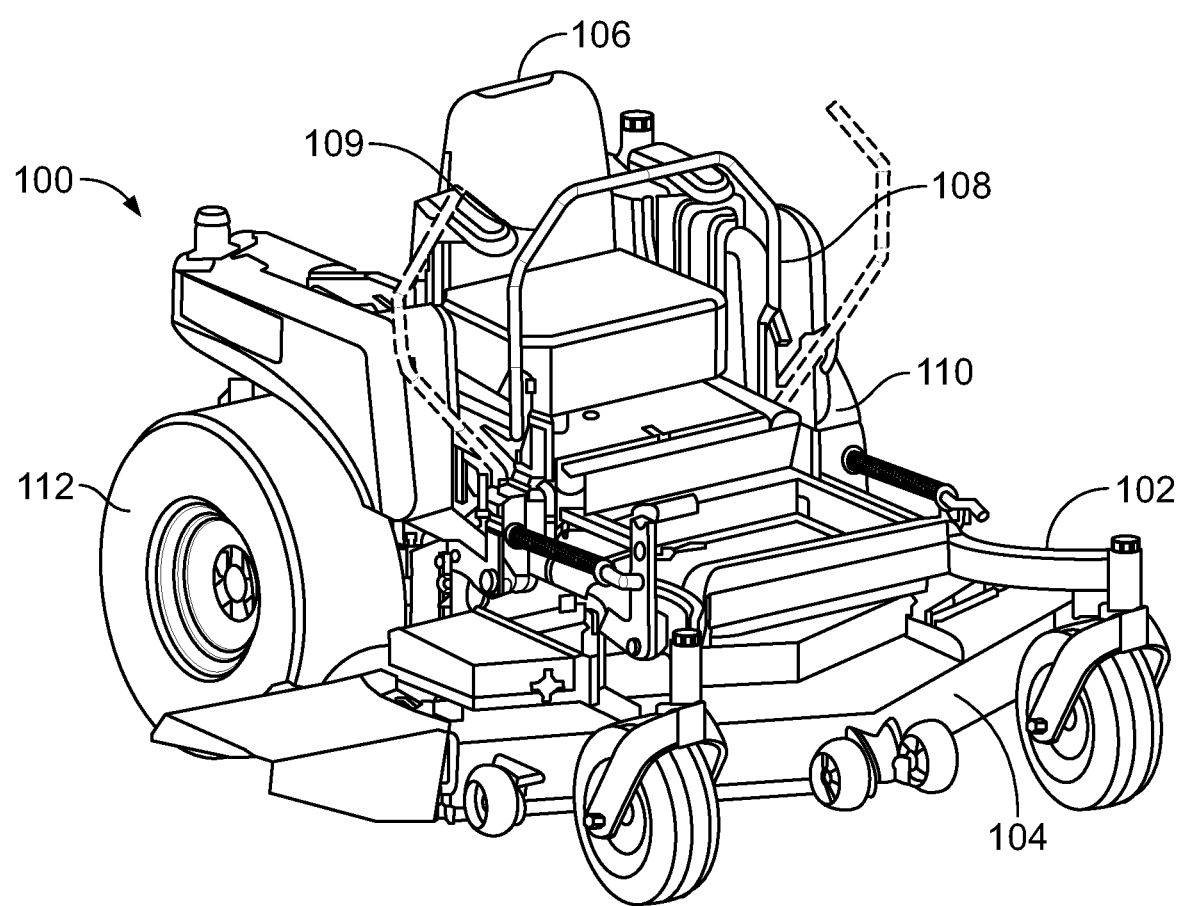
FIG. 1 illustrates a perspective view of a mower, in accordance with an example implementation.

FIG. 1 illustrates a perspective view of a mower 100, in accordance with an example implementation. The mower 100 can be, for example, zero-turn-radius mower (e.g., a lawn mower with a turning radius that is effectively zero).

The mower 100 includes a frame 102. The mower 100 also includes a mower deck 104 supported by the frame 102 for mowing grass, for example. The mower 100 further includes an operator seat 106 and steering control levers 108, 109 for operating the mower 100.

In examples, a rear mounted engine (not shown) can be mounted to the frame 102 behind the operator seat 106. The engine can, for example, be an internal combustion engine configured to provide power to a drive system coupled to respective rear wheels such as left wheel 110 and right wheel 112 that drive the mower 100.

Each wheel of the wheels 110, 112 can be independently controlled via respective hydrostatic transmissions as described in details below, and the steering control levers 108, 109 can be configured to control speed and direction of the wheels 110, 112 via actuating the respective hydrostatic transmissions. Thus, the drive system can be controlled by an operator to independently drive the wheels 110, 112 to propel the mower 100. The configuration of the mower 100 is an example configuration and it should be understood that other mower configurations and vehicle types can be used.

The hydrostatic transmissions can also be used to brake the mower 100 during operation when the engine is running. When the engine is turned off, however, the hydrostatic transmissions might not be capable of securing the mower 100 in a parked stated. A lever-actuated parking brake used to park the mower 100 when the engine is turned off is disclosed herein.

Figure 2:
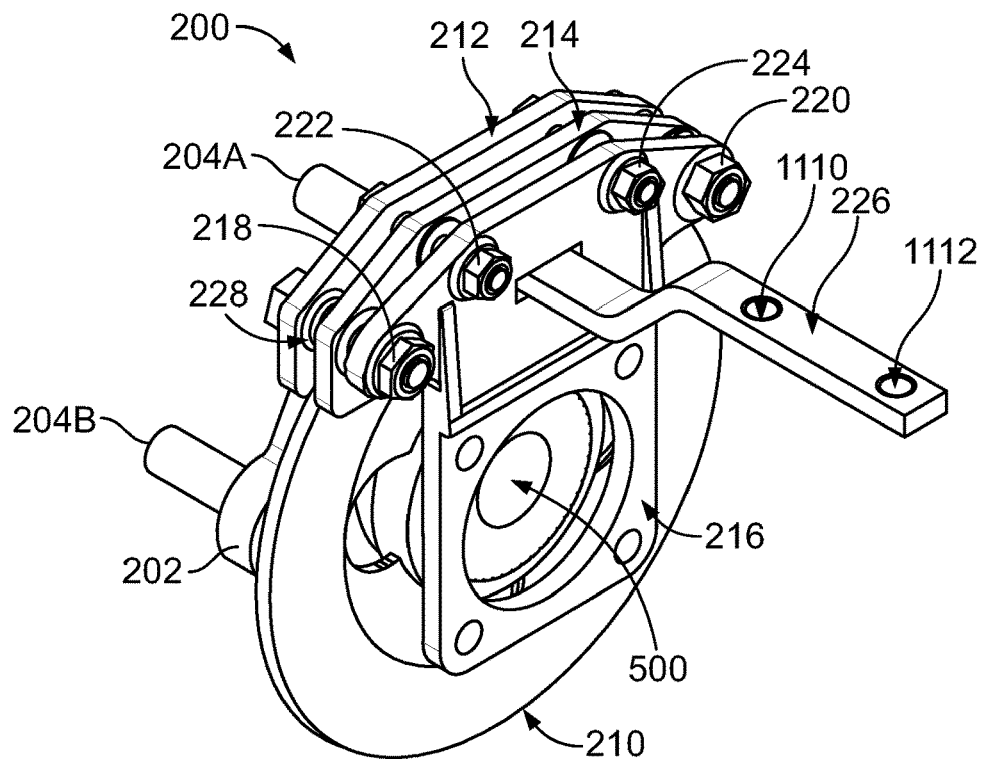
FIG. 2 illustrates a perspective view of a brake assembly 200 of a lever-actuated parking brake for a mower, in accordance with an example implementation.
Figure 3:
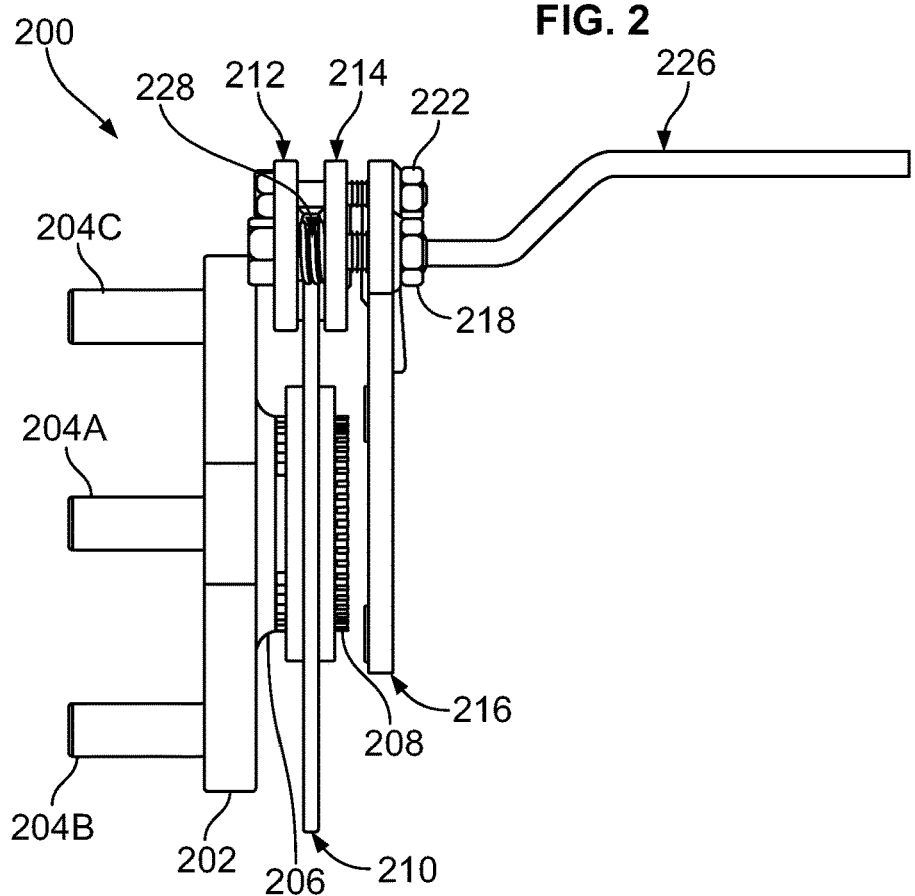
FIG. 3 illustrates a side view of the brake assembly of FIG. 2, in accordance with an example implementation.
Figure 4:
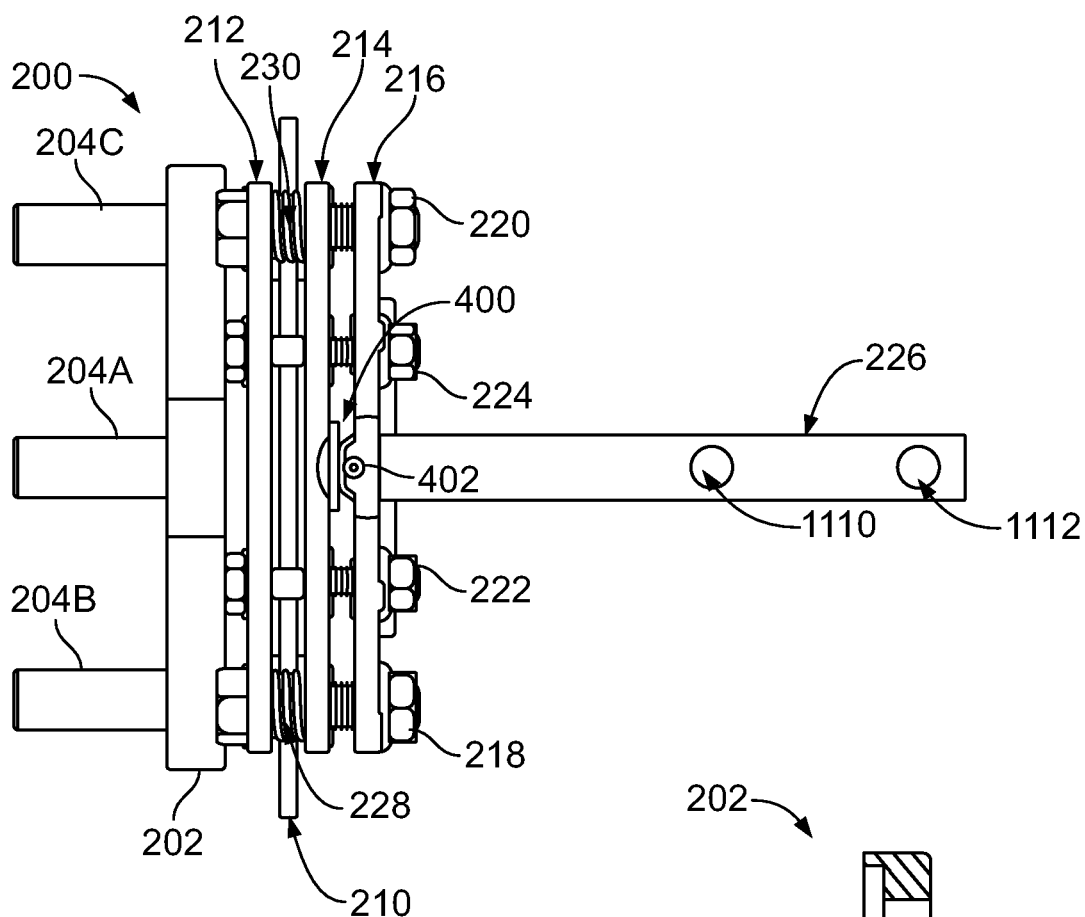
FIG. 4 illustrates a partial cross-sectional top view of the brake assembly of FIG. 2, in accordance with an example implementation.

FIG. 2 illustrates a perspective view of a brake assembly 200 of a lever-actuated parking brake for the mower 100, FIG. 3 illustrates a side view of the brake assembly 200, and FIG. 4 illustrates a partial cross-sectional top view of the brake assembly 200, in accordance with an example implementation. FIGS. 2, 3, and 4 are described together.

The mower 100 can include a hub 202 (shown in FIGS. 2-4) that is configured to be coupled or mounted to a wheel of the wheels 110, 112 of the mower 100 via fasteners 204A, 204B, and 204C. The hub 202 has a splined central portion 206 that protrudes inward, i.e., away from the wheel 110, 112. An exterior peripheral surface of the splined central portion 206 has splines 208, i.e., ridges or teeth, disposed or formed on the exterior peripheral surface of the splined central portion 206.

Figure 5:
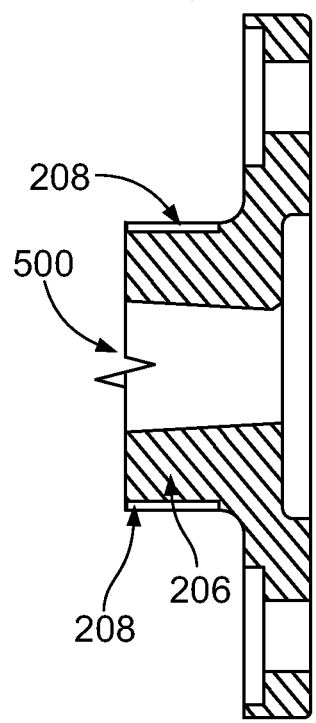
FIG. 5 illustrates a cross-sectional side view of a hub, in accordance with an example implementation.

FIG. 5 illustrates a cross-sectional side view of the hub 202, in accordance with an example implementation. The hub 202, and particularly, the splined central portion 206, includes a tapered hole 500. The tapered hole 500 is configured to receive therein a drive shaft of a hydrostatic transmission. The drive shaft can have a corresponding taper that matches the taper angle of the tapered hole 500, such that the drive shaft is drivingly coupled to the splined central portion 206 of the hub 202 via an interference fit. The hydrostatic transmission provides rotational power to the drive shaft, which in turn transmits the rotational power to the hub 202.

Figure 6:
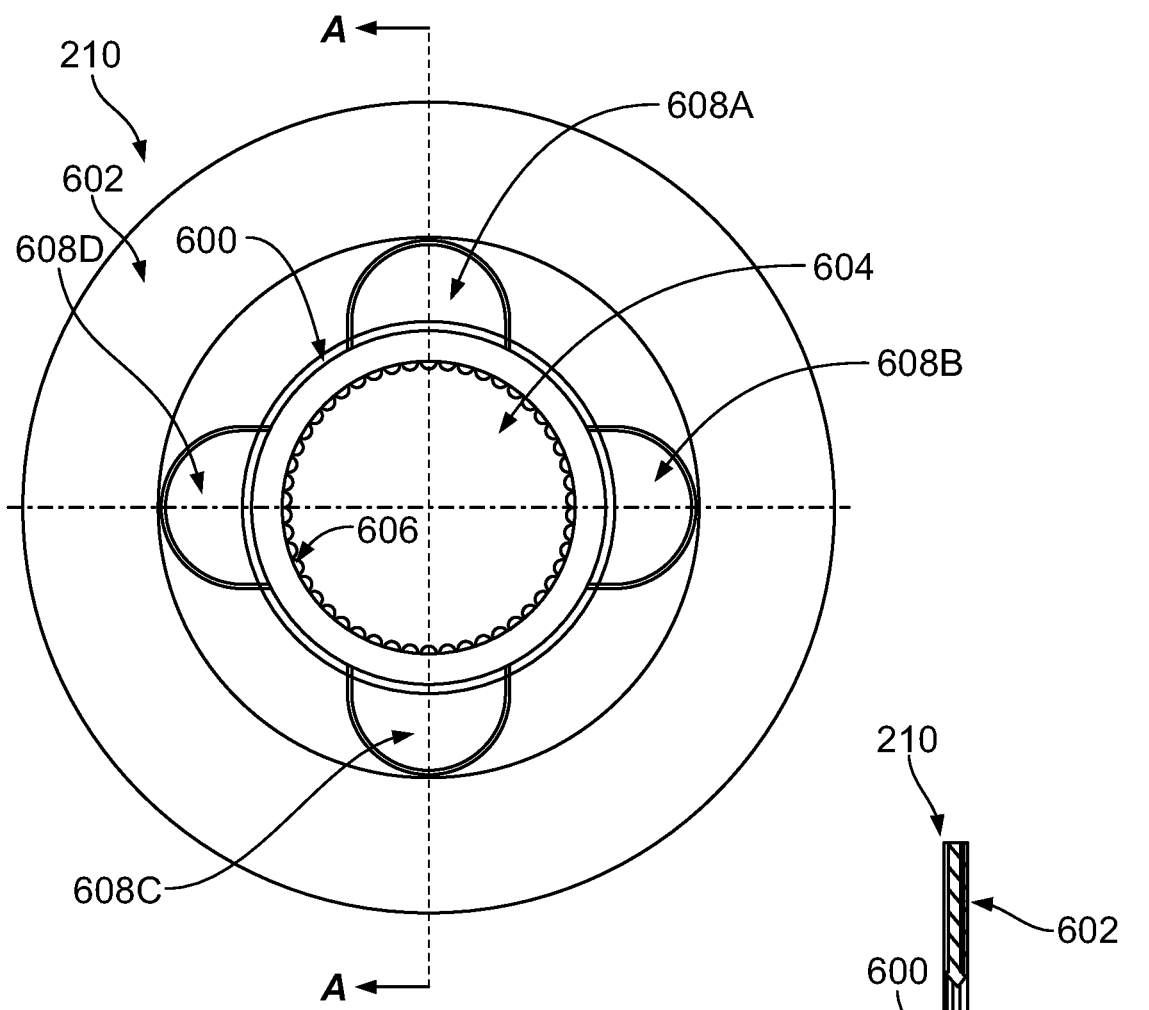
FIG. 6 illustrates a front view of a brake disk, in accordance with an example implementation.
Figure 7:
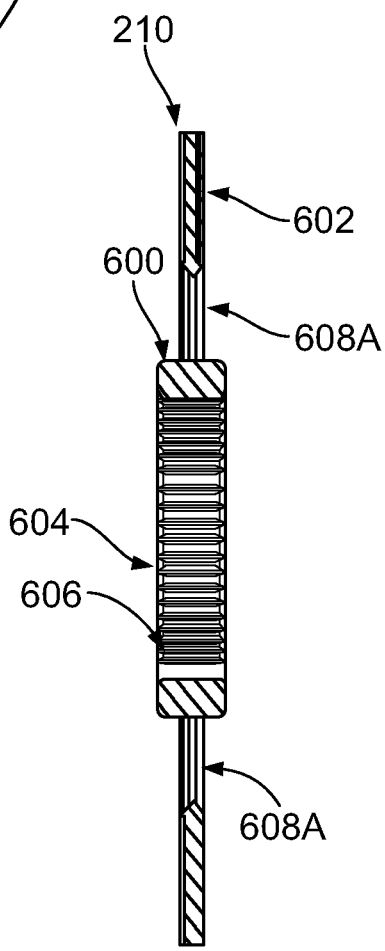
FIG. 7 illustrates a cross-sectional side view of the brake disk of FIG. 6, in accordance with an example implementation.

Referring back to FIGS. 2-4, the brake assembly 200 further includes a brake disk 210 mounted to the splined central portion 206 of the hub 202. FIG. 6 illustrates a front view of the brake disk 210, and FIG. 7 illustrates a cross-sectional side view of the brake disk 210, in accordance with an example implementation.

The brake disk 210 has a disk central portion 600 and a disk peripheral portion 602. The disk central portion 600 is axially enlarged and is thicker than the disk peripheral portion 602. The disk central portion 600 includes a hole 604 configured to receive the splined central portion 206 of the hub 202 therethrough. Particularly, the disk central portion 600 has spline grooves 606 disposed on an interior peripheral surface thereof bounding the hole 604, and the spline grooves 606 are configured to engage with the splines 208 of the splined central portion 206 of the hub 202.

With this configuration, the hub 202 and the brake disk 210 are rotatably coupled or engaged, such that the torque provided to the hub 202 or the brake disk 210 is transmitted to the other. As such, the spline engagement between the brake disk 210 and the hub 202 maintains angular correspondence between them. Further, braking or applying a force to the brake disk 210 that precludes the brake disk 210 from rotating also precludes the hub 202 and the wheel coupled thereto from rotating.

As depicted in FIG. 6, the brake disk 210, and particularly the disk peripheral portion 602, includes a petal-shaped pattern of semi-circular holes 608A, 608B, 608C, and 608D. As described below with respect to FIG. 10, the semi-circular holes 608A, 608B, 608C, and 608D provide access to inward components of the brake assembly 200 from the side of the hub 202 to facilitate mounting the brake assembly 200 to a hydraulic motor of the hydrostatic transmission of the mower 100.

Referring back to FIGS. 2-4, the brake assembly 200 further includes an outer brake caliper 212 and an inner brake caliper 214 straddling the brake disk 210, such that the brake disk 210 is interposed or sandwiched between the outer brake caliper 212 and the inner brake caliper 214. In an example implementation, the outer brake caliper 212 can be stationary, whereas the inner brake caliper 214 is movable. As such, moving the inner brake caliper 214 toward the brake disk 210, causes the brake disk 210 to be squeezed between the brake calipers 212, 214. In other words, the brake calipers 212, 214 can apply a torque about a center of the brake disk 210 to preclude the brake disk 210 from rotating, thereby also precluding the hub 202 from rotating and placing the mower 100 in a parking brake mode.

FIG. 8 illustrates a front view of the inner brake caliper 214, and FIG. 9 illustrates a bottom cross-sectional view of the inner brake caliper 214, in accordance with an example implementation. As shown in FIG. 8, the inner brake caliper 214 has through-holes 800, 802 disposed closer to a periphery of the inner brake caliper 214. The inner brake caliper 214 also has through-holes 804, 806 disposed closer to a center of the inner brake caliper 214. The through-holes 800, 802, 804, and 806 are configured to receive fasteners therethrough and through corresponding through-holes in the outer brake caliper 212 to couple the inner brake caliper 214 to the outer brake caliper 212.

The inner brake caliper 214 can include a brake pad 807 configured as a backing plate with friction material bound to its surface. The brake pad 807 faces toward the brake disk 210. The outer brake caliper 212 can also have a similar brake pad with its friction material facing toward the brake disk 210. When the inner brake caliper 214 moves toward the brake disk 210 and the disk brake is squeezed between the brake calipers 212, 214, the brake pad 807 (and the corresponding brake pad of the outer brake caliper 212) and the brake disk 210 "stick" to each other, providing the friction that can secure the mower 100 in-place, i.e., in parking mode.

Further, as depicted in FIG. 9, the inner brake caliper 214 can include a key slot 808 that can be rectangular in shape. Referring to FIGS. 4 and 9, the key slot 808 of the inner brake caliper 214 is configured to receive a key 400 therein (the key 400 is shown in FIG. 4). The key 400 can be rectangular in shape to match the shape of the key slot 808. Further, the key 400 is configured to be disposed partially within the key slot 808 and partially protruding from the inner brake caliper 214 as depicted in FIG. 4 (i.e., protruding inward, to the right in FIG. 4, toward the hydrostatic transmission or hydraulic motor side of the mower 100). With this configuration, if the key 400 is pushed outward (to the left in FIG. 4) as described below, the key 400 in turn pushes the inner brake caliper 214 toward the outer brake caliper 212, and the brake disk 210 is squeezed therebetween.

Figure 10:
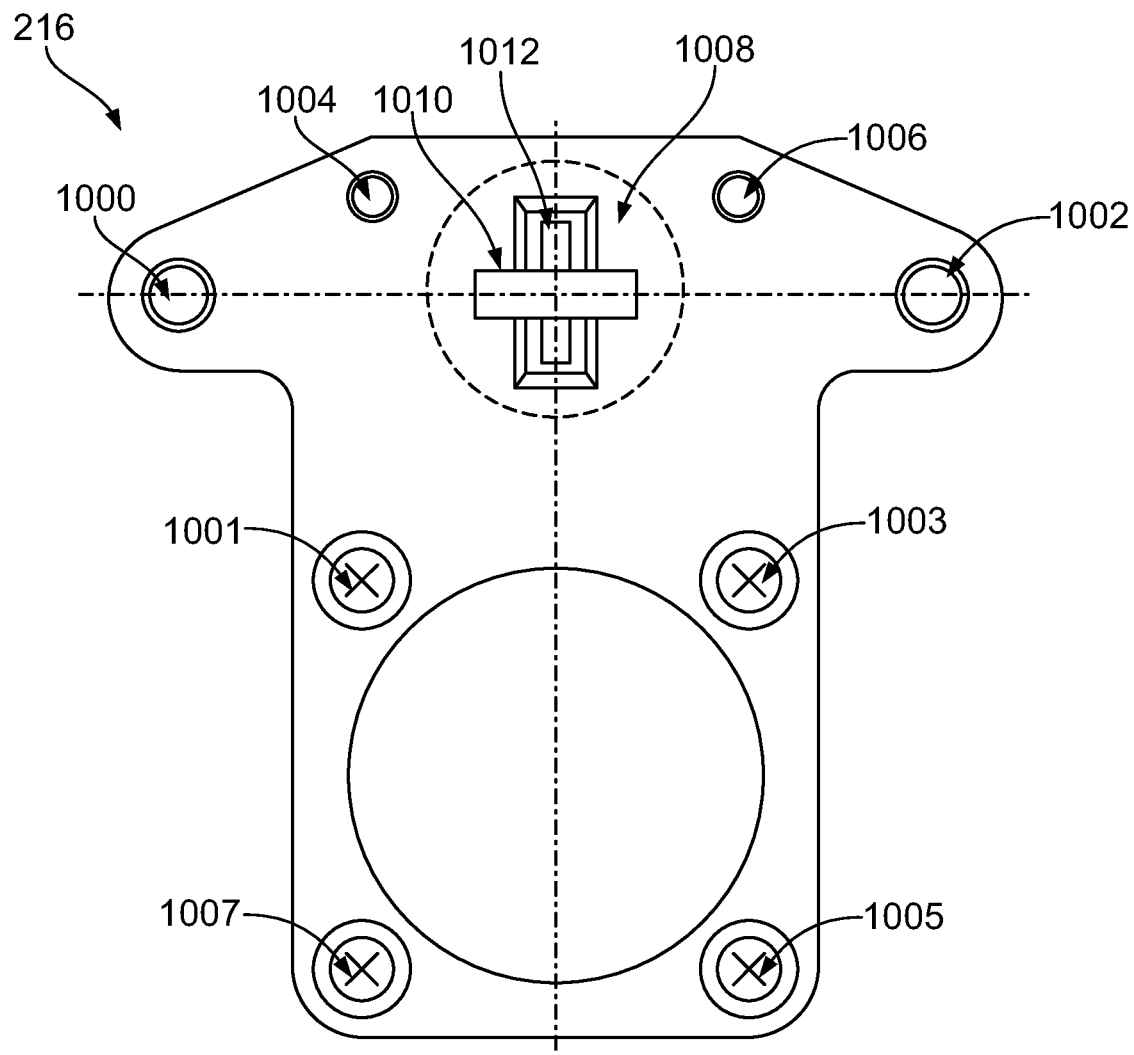
FIG. 10 illustrates a front view of a mounting plate, in accordance with an example implementation.

As shown in FIGS. 2-4, the brake assembly 200 further includes a mounting plate 216 disposed adjacent to the inner brake caliper 214 and configured to be coupled to the inner brake caliper 214 and the outer brake caliper 212. FIG. 10 illustrates a front view of the mounting plate 216, in accordance with an example implementation. Similar to the inner brake caliper 214, the mounting plate 216 has through-holes 1000, 1002 disposed closer to a periphery of the mounting plate 216. The mounting plate 216 also has through-holes 1004, 1006 disposed closer to a center of the mounting plate 216.

The through-holes 1000, 1002, 1004, and 1006 are configured to receive therethrough the fasteners disposed through the through-holes 800-806 of the inner brake caliper 214 and the corresponding through-holes in the outer brake caliper 212 to couple the mounting plate 216 to the inner brake caliper 214 to the outer brake caliper 212. Particularly, as shown in FIGS. 2-4, the brake assembly 200 can include: (i) a fastener 218 that can be inserted through the through-hole 1002, the through-hole 802 and the corresponding through-hole of the outer brake caliper 212, (ii) a fastener 220 that can be inserted through the through-hole 1000, the through-hole 800 and the corresponding through-hole of the outer brake caliper 212, (iii) a fastener 222 that can be inserted through the through-hole 1006, the through-hole 806 and the corresponding through-hole of the outer brake caliper 212, and (iv) a fastener 224 that can be inserted through the through-hole 1004, the through-hole 804 and the corresponding through-hole of the outer brake caliper 212. With this configuration, the fasteners 218-224 couple the mounting plate 216, the inner brake caliper 214, and the outer brake caliper 212 to each other.

As depicted in FIG. 10, the mounting plate 216 further includes four through-holes 1001, 1003, 1005, and 1007 that are configured to receive respective fasteners to couple the mounting plate 216 to a hydraulic motor of a hydrostatic transmission. The hydraulic motor can have a mounting interface with a hole pattern that matches the pattern of the through-holes 1001, 1003, 1005, and 1007. Notably, the through-holes 1001, 1003, 1005, and 1007 are accessible from the side of the hub 202 via the semi-circular holes 608A, 608B, 608C, and 608D of the brake disk 210. As such, the brake assembly 200 can be mounted to the hydraulic motor by way of an operator aligning the through-holes 1001, 1003, 1005, and 1007 with corresponding holes of the hydraulic motor, then inserting fasteners via the semi-circular holes 608A, 608B, 608C, and 608D of the brake disk 210, then through the through-holes 1001, 1003, 1005, and 1007 and the corresponding holes of the hydraulic motor.

As depicted in FIG. 10, the mounting plate 216 further includes a slot 1008 that is cross-shaped and has a lateral slot portion 1010 and a vertical slot portion 1012. The lateral slot portion 1010 is configured to be a through-slot and is aligned with the key 400, whereas the vertical slot portion 1012 might not be a through-slot, and is rather formed as an indentation in the mounting plate 216.

Referring to FIGS. 2-4 along with FIG. 10, the brake assembly 200 further includes a brake actuation lever 226 configured to be disposed through the lateral slot portion 1010 of the mounting plate 216. As depicted in FIG. 4, the brake actuation lever 226 is disposed through the mounting plate 216 (via the lateral slot portion 1010) to interface with or contact the key 400, which is disposed in the key slot 808 of the inner brake caliper 214. Further, the brake actuation lever 226 is pivotably coupled to the mounting plate 216 via a pivot pin 402, which is received in the vertical slot portion 1012 of the slot 1008 of the mounting plate 216. The brake actuation lever 226 can laterally pivot about the pivot pin 402 in either a clockwise or counter-clockwise direction to push the key 400 and the inner brake caliper 214 toward the brake disk 210 as described next.

FIG. 11 illustrates a cross-sectional side view of the brake actuation lever 226, and FIG. 12 illustrates a top view of the brake actuation lever 226, in accordance with an example implementation. The brake actuation lever 226 includes a through-hole 1100 that is configured to receive the pivot pin 402 therethrough so as to pivotably couple the brake actuation lever 226 to the mounting plate 216.

A tip 1102 of the brake actuation lever 226 is configured to have a flat surface portion 1104 straddled by a first lateral curved surface 1106 and a second lateral curved surface 1108. With this configuration of the tip 1102, rotating the brake actuation lever 226 in either a first rotational direction (e.g., clockwise) or a second rotational direction (e.g., counter-clockwise) opposite the first rotational direction can actuate the brake calipers 212, 214.

Figure 13:
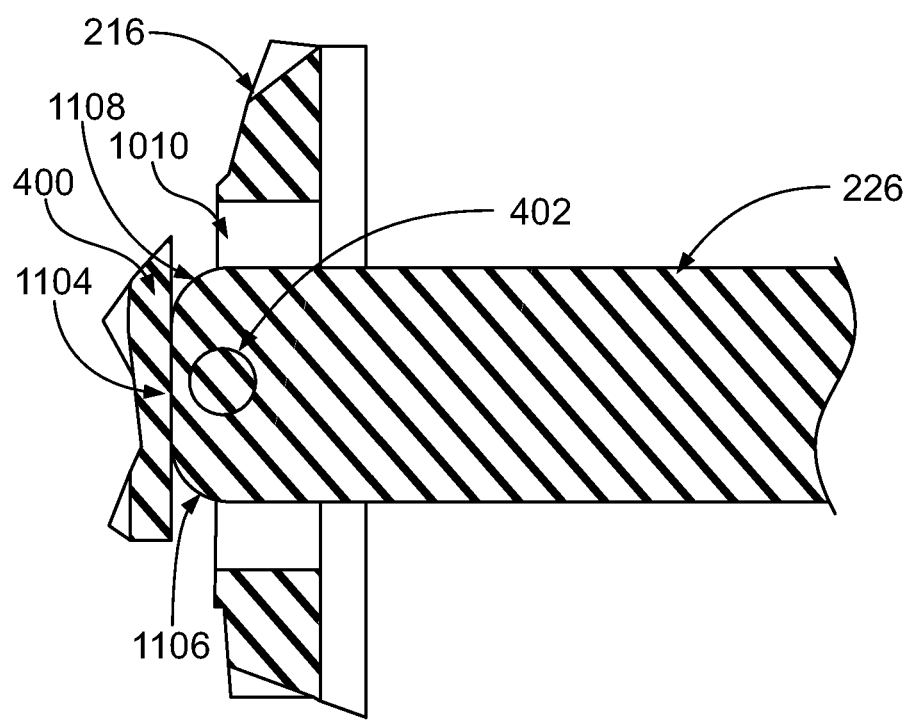
FIG. 13 illustrates a partial top cross-sectional view of a brake actuation lever interfacing with a key, in accordance with an example implementation.

FIG. 13 illustrates a partial top cross-sectional view of the brake actuation lever 226 interfacing with the key 400, in accordance with an example implementation. The brake actuation lever 226 is shown in a neutral position in FIG. 13 where the flat surface portion 1104 contacts the key 400. In this neutral position, the inner brake caliper 214 remains in its unactuated position, and the brake disk 210 and the hub 202 are free to rotate. The brake actuation lever 226 is placed in the neutral position to allow the mower 100 to operate and move.

If the brake actuation lever 226 is rotated by an operator of the mower 100 in a clockwise direction, the lateral curved surface 1106 can engage the key 400 and push the key 400 (to the left in FIG. 13 and FIG. 4). The key 400 in turn pushes the inner brake caliper 214 toward the brake disk 210 and squeeze the brake disk 210 between the brake calipers 212, 214 to place the mower 100 in parking mode wherein the brake disk 210 and the hub 202 are precluded from moving.

Similarly, if the brake actuation lever 226 is rotated by the operator of the mower 100 in a counter-clockwise direction, the lateral curved surface 1108 can engage the key 400 and push the key 400 (to the left in FIG. 13 and FIG. 4). The key 400 in turn pushes the inner brake caliper 214 toward the brake disk 210 and squeezes the brake disk 210 between the brake calipers 212, 214 to place the mower 100 in parking mode wherein the brake disk 210 and the hub 202 are precluded from moving.

With this configuration, the tip 1102 of the brake actuation lever 226 operates as a cam that converts rotation of the brake actuation lever 226 to reciprocation of the inner brake caliper 214. Particularly, the flat surface portion 1104 operates as a "dwell" portion of the cam at which the key 400 and the inner brake caliper 214 are unactuated, whereas the lateral curved surfaces 1106, 1108 operate as "rise" portions of the cam configured to actuated the inner brake caliper 214.

In an example, the key 400 can be made of a hardened material. However, the key 400 may be inexpensive because of its size. As such, the key 400 can provide a hardened surface against which the brake actuation lever 226 acts to allow the inner brake caliper 214, which can be made of a less expensive softer, powder metal material, to be protected by an inexpensive yet hardened part (i.e., the key 400). In other example implementations, the brake actuation lever 226 can interface with the inner brake caliper 214 directly without having the key 400 therebetween.

As such, the brake assembly 200 can be actuated to place the mower 100 in parking mode regardless of the direction of lateral rotation of the brake actuation lever 226. The operator of the mower 100 can apply a torque on the brake actuation lever 226 directly or via a linkage mechanism coupled to the brake actuation lever 226 via through-holes 1110, 1112 shown in the FIGS. 2, 4, and 11-12.

Referring to FIG. 4, the brake assembly 200 can include a first spring 228 disposed about the fastener 218 and a second spring 230 disposed about the fastener 220. The springs 228, 230 are interposed between the inner brake caliper 214 and the outer brake caliper 212.

The springs 228, 230 can be configured as compressible springs that apply biasing forces on the brake calipers 212, 214 that tend to push the brake calipers 212, 214 away from each other to allow the brake disk 210 to rotate freely during operation of the mower 100. When the brake actuation lever 226 is rotated in either rotational direction, the inner brake caliper 214 moves toward the brake disk 210 and the outer brake caliper 212 as mentioned above. As a result, the springs 228, 230 are compressed as the brake disk 210 is squeezed between the brake calipers 212, 214 and is precluded from rotation. Once the brake actuation lever 226 is placed back into an un-rotated, neutral position, the springs 228, 230 push the inner brake caliper 214 away from the outer brake caliper 212, thereby releasing the brake disk 210 and allowing the mower 100 to operate.

Although two springs 228, 230 are shown in the Figures, fewer or more springs can be used. For instance, more springs can be disposed about one or both of the fasteners 222, 224 between the inner brake caliper 214 and the outer brake caliper 212 if desired.

Figure 14:
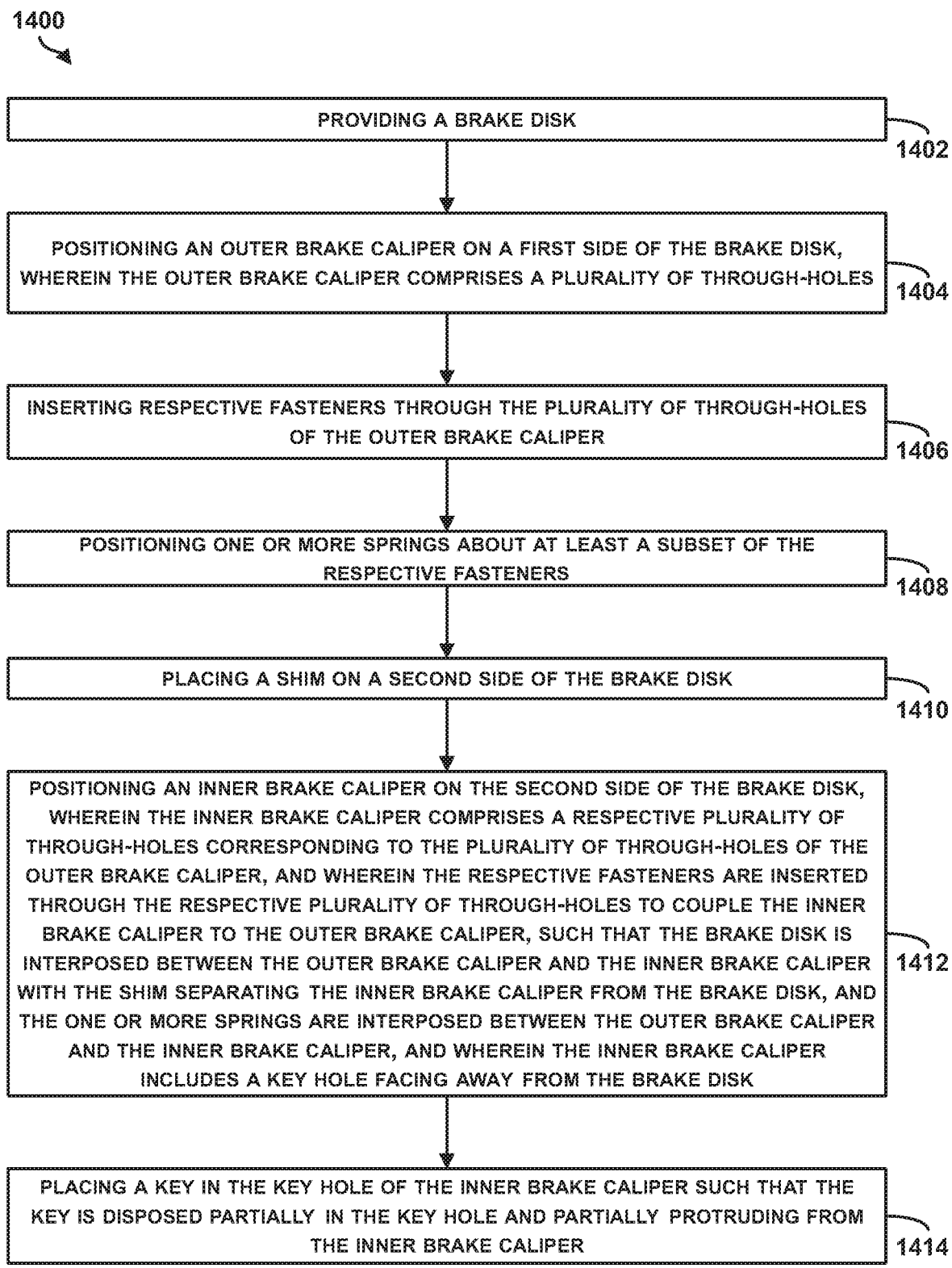
FIG. 14 is a flowchart of a method for assembling a brake assembly and mounting the brake assembly to a vehicle, in accordance with an example implementation.

FIG. 14 is a flowchart of a method 1400 for assembling the brake assembly 200 and mounting the brake assembly to a vehicle (e.g., the mower 100), in accordance with an example implementation.

The method 1400 may include one or more operations, or actions as illustrated by one or more of blocks 1402-1414, 1502-1510, and 160-2-1604. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 1402, the method 1400 includes providing the brake disk 210. The term "providing" as used herein, and for example with regard to the brake disk 210 or other components includes any action to make the brake disk 210 or any other component available for use, such as supplying the brake disk 210 or bringing the brake disk 210 to an apparatus or to a work environment for further processing (e.g., mounting other components, etc.).

At block 1404, the method 1400 includes positioning the outer brake caliper 212 on a first side of the brake disk 210, wherein the outer brake caliper 212 comprises a plurality of through-holes.

At block 1406, the method 1400 includes inserting respective fasteners (e.g., the fasteners 218-224) through the plurality of through-holes of the outer brake caliper 212.

At block 1408, the method 1400 includes positioning one or more springs (e.g., the springs 228, 230) about at least a subset of the respective fasteners 218-224.

At block 1410, the method 1400 includes placing a shim on a second side of the brake disk 210.

At block 1412, the method 1400 includes positioning the inner brake caliper 214 on the second side of the brake disk 210, wherein the inner brake caliper 214 comprises a respective plurality of through-holes (the through-holes 800-806) corresponding to the plurality of through-holes of the outer brake caliper 212, and wherein the respective fasteners 218-224 are inserted through the respective plurality of through-holes 800-806 to couple the inner brake caliper 214 to the outer brake caliper 212, such that the brake disk 210 is interposed between the outer brake caliper 212 and the inner brake caliper 214 with the shim separating the inner brake caliper 214 from the brake disk 210, and the one or more springs 228, 230 are interposed between the outer brake caliper 212 and the inner brake caliper 214, and wherein the inner brake caliper 214 includes the key slot 808 facing away from the brake disk 210.

At block 1414, the method 1400 includes placing the key 400 in the key slot 808 of the inner brake caliper 214 such that the key 400 is disposed partially in the key slot 808 and partially protruding from the inner brake caliper 214.

Figure 15:
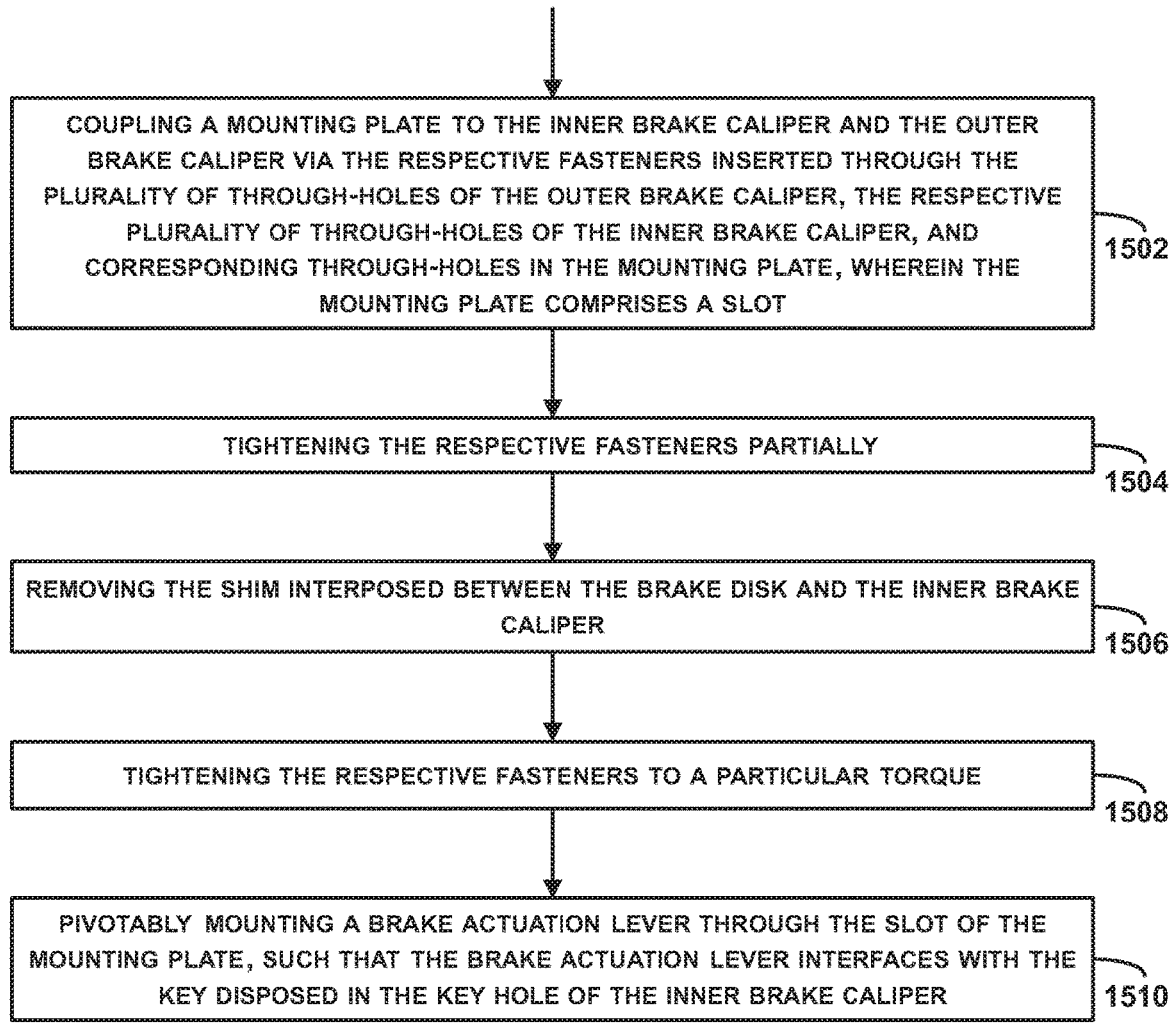
FIG. 15 is a flowchart of additional operations performed with the method of FIG. 14, in accordance with an example implementation.

FIG. 15 is a flowchart of additional operations performed with the method 1400 of FIG. 14, in accordance with an example implementation. At block 1502, operations include coupling the mounting plate 216 to the inner brake caliper 214 and the outer brake caliper 212 via the respective fasteners 218-224 inserted through the plurality of through-holes of the outer brake caliper 212, the respective plurality of through-holes 800-806 of the inner brake caliper 214, and corresponding through-holes (e.g., the through-holes 1000-1006) in the mounting plate 216, wherein the mounting plate 216 comprises the slot 1008. As mentioned above, the slot 1008 can be cross-shaped and can have the lateral slot portion 1010 and the vertical slot portion 1012. The lateral slot portion 1010 is configured to be a through-slot, whereas the vertical slot portion 1012 might not be a through-slot, and is rather formed as an indentation in the mounting plate 216.

At block 1504, operations include tightening the respective fasteners 218-224 partially.

At block 1506, operations include removing the shim interposed between the brake disk 210 and the inner brake caliper 214. The thickness of the shim can be selected to cause a particular gap between the inner brake caliper 214 and the brake disk 210. That gap is then traversed by the inner brake caliper 214 when the brake actuation lever 226 is actuated.

At block 1508, operations include tightening the respective fasteners 218-224 to a particular torque. For example, the particular torque can be applied uniformly on the respective fasteners 218-224 until the inner brake caliper 214 and the outer brake caliper 212 lightly press against the brake disk 210 but do not hinder its rotation.

At block 1510, operations include pivotably mounting the brake actuation lever 226 through the slot 1008 of the mounting plate 216, such that the brake actuation lever 226 interfaces with the key 400 disposed in the key slot 808 of the inner brake caliper 214. The pivot pin 402 can be used as described above to pivotably couple the brake actuation lever 226 to the mounting plate 216.

Figure 16:
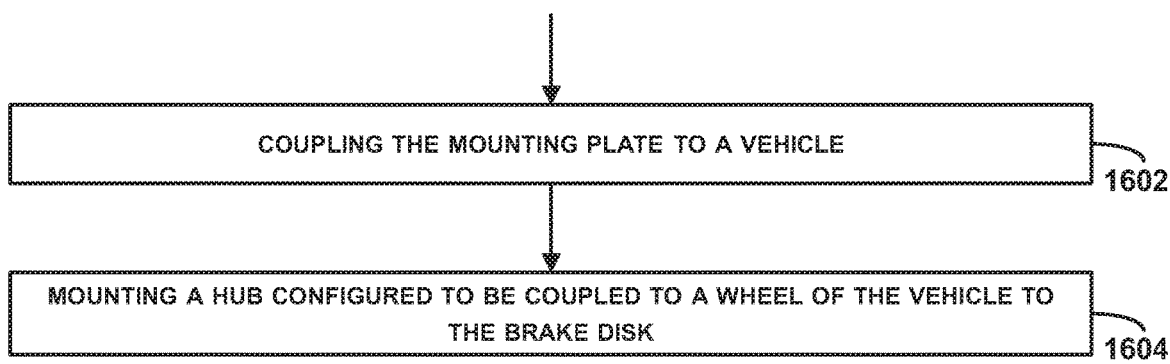
FIG. 16 is a flowchart of additional operations performed with the method of FIG. 14, in accordance with an example implementation.

FIG. 16 is a flowchart of additional operations performed with the method 1400 of FIG. 14, in accordance with an example implementation. At block 1602, operations include coupling the mounting plate 216 to a vehicle (e.g., the mower 100). As described above, brake disk 210 can have the disk central portion 600 and the disk peripheral portion 602. The disk peripheral portion 602 can include the semi-circular holes 608A, 608B, 608C, and 608D. The semi-circular holes 608A, 608B, 608C, and 608D provide access to mounting plate 216 to facilitate coupling the mounting plate 216 to a hydrostatic transmission of the vehicle (e.g., to the hydraulic motor of the hydrostatic transmission of the mower 100).

At block 1604, operations include mounting the hub 202 configured to be coupled to a wheel of the vehicle to the brake disk 210. As described above, the hub 202 is configured to be coupled or mounted to a wheel of the wheels 110, 112 of the mower 100 via the fasteners 204A, 204B, and 204C. The hub 202 can have the splined central portion 206 that protrudes inward away from the wheel 110, 112. The exterior peripheral surface of the splined central portion 206 has the splines 208. The brake disk 210 can have the disk central portion 600 and the disk peripheral portion 602. The disk central portion 600 includes the hole 604 configured to receive the splined central portion 206 of the hub 202 therethrough. Particularly, the disk central portion 600 has spline grooves 606 disposed on an interior peripheral surface thereof bounding the hole 604, and the spline grooves 606 are configured to engage with the splines 208 of the splined central portion 206 of the hub 202.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A brake assembly comprising:
    a brake disk;
    an outer brake caliper disposed on a first side of the brake disk;
    an inner brake caliper disposed on a second side of the brake disk such that the brake disk is interposed between the outer brake caliper and the inner brake caliper, wherein the inner brake caliper comprises a key slot facing away from the brake disk;
    a key disposed in the key slot;
    a mounting plate disposed adjacent to the inner brake caliper, wherein the mounting plate is coupled to the inner brake caliper and the outer brake caliper, and wherein the mounting plate comprises a slot; and
    a brake actuation lever pivotably coupled to the mounting plate at a pivot formed in the mounting plate and disposed through the slot of the mounting plate to interface with the key, wherein rotation of the brake actuation lever causes the key and the inner brake caliper to move toward the outer brake caliper, thereby squeezing the brake disk between the inner brake caliper and the outer brake caliper.

2. The brake assembly of claim 1, wherein the inner brake caliper is coupled to the outer brake caliper via a plurality of fasteners, and wherein the mounting plate is coupled to the inner brake caliper and the outer brake caliper via the plurality of fasteners.

3. The brake assembly of claim 2, further comprising:
    one or more springs disposed about at least a subset of the plurality of fasteners such that the one or more springs are interposed between the outer brake caliper and the inner brake caliper and are configured to apply a biasing force on the inner brake caliper that tends to push the inner brake caliper away from the outer brake caliper, and wherein the rotation of the brake actuation lever causes the key and the inner brake caliper to move toward the outer brake caliper against the biasing force of the one or more springs.

4. The brake assembly of claim 1, wherein the brake disk comprises a disk central portion and a disk peripheral portion, wherein the disk central portion comprises a hole and spline grooves disposed on an interior peripheral surface of the disk central portion and bounding the hole, and wherein the spline grooves are configured to engage with splines of a hub coupled to a wheel of a vehicle.

5. The brake assembly of claim 4, wherein the disk peripheral portion comprises a plurality of semi-circular holes configured to provide access to the mounting plate from the first side of the brake disk.

6. The brake assembly of claim 1, wherein the slot of the mounting plate comprises a lateral slot portion and a vertical slot portion, wherein the lateral slot portion is configured as a through-slot and is aligned with the key, wherein the brake actuation lever is mounted through the lateral slot portion to interface with the key, wherein the vertical slot portion is configured to receive a pivot pin that pivotably couples the brake actuation lever to the mounting plate.

7. The brake assembly of claim 1, wherein a tip of the brake actuation lever interfaces with the key, wherein the tip comprises a flat surface portion and at least one lateral curved surface, wherein the flat surface portion contacts the key when the brake actuation lever is in a neutral position, and wherein rotation of the brake actuation lever causes the at least one lateral curved surface to contact the key, thereby pushing the key and the inner brake caliper toward the brake disk.

8. The brake assembly of claim 7, wherein the at least one lateral curved surface comprise a first lateral curved surface and a second lateral curved surface, wherein the flat surface portion is disposed between the first lateral curved surface and the second lateral curved surface, such that rotation of the brake actuation lever in a first rotational direction causes the first lateral curved surface to contact the key, whereas rotation of the brake actuation lever in a second rotational direction opposite the first rotational direction causes the second lateral curved surface to contact the key.

9. The brake assembly of claim 1, wherein the key is configured to be disposed partially in the key slot of the inner brake caliper and partially protruding from the inner brake caliper away from the brake disk to interface with the brake actuation lever.

10. A vehicle comprising:
    a wheel;
    a hub mounted to the wheel; and
    a brake assembly comprising:
        a brake disk mounted to the hub,
        an outer brake caliper disposed on a first side of the brake disk,
        an inner brake caliper disposed on a second side of the brake disk such that the brake disk is interposed between the outer brake caliper and the inner brake caliper,
        a mounting plate disposed adjacent to the inner brake caliper, wherein the mounting plate is coupled to the inner brake caliper and the outer brake caliper, and wherein the mounting plate comprises a slot, and
        a brake actuation lever pivotably coupled to the mounting plate at a pivot formed in the mounting plate and disposed through the slot of the mounting plate to interface with the inner brake caliper, wherein rotation of the brake actuation lever causes the inner brake caliper to move toward the outer brake caliper, thereby squeezing the brake disk between the inner brake caliper and the outer brake caliper and precluding the hub and the wheel from rotating.

11. The vehicle of claim 10, wherein the inner brake caliper is coupled to the outer brake caliper via a plurality of fasteners, and wherein the mounting plate is coupled to the inner brake caliper and the outer brake caliper via the plurality of fasteners.

12. The vehicle of claim 11, wherein the brake assembly further comprises:
    one or more springs disposed about at least a subset of the plurality of fasteners such that the one or more springs are interposed between the outer brake caliper and the inner brake caliper and are configured to apply a biasing force on the inner brake caliper that tends to push the inner brake caliper away from the outer brake caliper, and wherein rotation of the brake actuation lever causes the inner brake caliper to move toward the outer brake caliper against the biasing force of the one or more springs.

13. The vehicle of claim 10, wherein:
the hub comprises a splined central portion having splines formed on an exterior peripheral surface thereof, wherein the splined central portion comprises a tapered hole configured to receive therein a drive shaft of a hydrostatic transmission of the vehicle to drive the wheel, and
the brake disk comprises a disk central portion and a disk peripheral portion, wherein the disk central portion comprises a hole and spline grooves disposed on an interior peripheral surface of the disk central portion and bounding the hole, and wherein the spline grooves are configured to engage with the splines of the hub.

14. The vehicle of claim 13, wherein the disk peripheral portion comprises a plurality of semi-circular holes configured to provide access to the mounting plate from the first side of the brake disk to facilitate mounting the mounting plate to the hydrostatic transmission.

15. The vehicle of claim 10, wherein the slot of the mounting plate comprises a lateral slot portion and a vertical slot portion, wherein the lateral slot portion is configured as a through-slot, wherein the brake actuation lever is mounted through the lateral slot portion to interface with the inner brake caliper, wherein the vertical slot portion is configured to receive a pivot pin that pivotably couples the brake actuation lever to the mounting plate.

16. The vehicle of claim 10, wherein a tip of the brake actuation lever interfaces with the inner brake caliper, wherein the tip comprises a flat surface portion and at least one lateral curved surface, wherein the flat surface portion contacts the inner brake caliper when the brake actuation lever is in a neutral position, and wherein rotation of the brake actuation lever causes the at least one lateral curved surface to contact the inner brake caliper, thereby pushing the inner brake caliper toward the brake disk.

17. The vehicle of claim 16, wherein the at least one lateral curved surface comprise a first lateral curved surface and a second lateral curved surface, wherein the flat surface portion is disposed between the first lateral curved surface and the second lateral curved surface, such that rotation of the brake actuation lever in a first rotational direction causes the first lateral curved surface to contact the inner brake caliper, whereas rotation of the brake actuation lever in a second rotational direction opposite the first rotational direction causes the second lateral curved surface to contact the inner brake caliper.

18. The vehicle of claim 10, wherein the brake assembly further comprises:
a key disposed in a key slot disposed in the inner brake caliper, wherein the key is configured to be disposed partially in the key slot of the inner brake caliper and partially protruding from the inner brake caliper away from the brake disk to interface with the brake actuation lever.

19. A method of assembling a brake assembly, the method comprising:
positioning an outer brake caliper on a first side of a brake disk, wherein the outer brake caliper comprises a plurality of through-holes;
inserting respective fasteners through the plurality of through-holes of the outer brake caliper;
positioning one or more springs about at least a subset of the respective fasteners;
positioning an inner brake caliper on the second side of the brake disk, wherein the inner brake caliper comprises a respective plurality of through-holes corresponding to the plurality of through-holes of the outer brake caliper, and wherein the respective fasteners are inserted through the respective plurality of through-holes to couple the inner brake caliper to the outer brake caliper, such that the brake disk is interposed between the outer brake caliper and the inner brake caliper and the one or more springs are interposed between the outer brake caliper and the inner brake caliper, and wherein the inner brake caliper includes a key hole facing away from the brake disk;
placing a key in the key hole of the inner brake caliper such that the key is disposed partially in the key hole and partially protruding from the inner brake caliper;
coupling a mounting plate to the inner brake caliper and the outer brake caliper via the respective fasteners inserted through the plurality of through-holes of the outer brake caliper, the respective plurality of through-holes of the inner brake caliper, and corresponding through-holes in the mounting plate, wherein the mounting plate comprises a slot;
tightening the respective fasteners to a particular torque; and
pivotably mounting a brake actuation lever to the mounting plate at a pivot formed in the mounting plate and through the slot of the mounting plate, such that the brake actuation lever interfaces with the key disposed in the key hole of the inner brake caliper.

20. The method of claim 19, further comprising:
coupling the mounting plate to a vehicle; and
mounting a hub configured to be coupled to a wheel of the vehicle to the brake disk.

* * * * *